United States Patent [19]

Agouri et al.

[11] 4,080,405

[45] Mar. 21, 1978

[54] PROCESS FOR CHEMICAL MODIFICATION OF POLYOLEFINS TO IMPROVE THEIR WETTABILITY

[75] Inventors: Elias Agouri; Robert Laputte; Jacques Rideau, all of Pau, France

[73] Assignee: Ato Chimie, Courbevoie, France

[21] Appl. No.: 752,465

[22] Filed: Dec. 20, 1976

[30] Foreign Application Priority Data

Dec. 23, 1975 France .................................. 75 39418

[51] Int. Cl.$^2$ .................... C08F 255/02; C08F 255/08
[52] U.S. Cl. ................................................. 260/878 R
[58] Field of Search .................................... 260/878 R

[56] References Cited

U.S. PATENT DOCUMENTS

| | | | |
|---|---|---|---|
| 3,848,025 | 11/1974 | Alberts et al. .................... | 260/878 R |
| 3,862,266 | 1/1975 | McConnell et al. ............. | 260/878 R |
| 3,873,643 | 3/1975 | Wu et al. .......................... | 260/878 R |
| 3,887,648 | 6/1975 | Takahashi et al. ............... | 260/878 R |
| 3,978,162 | 8/1976 | Nakanishi et al. ............... | 260/878 R |

Primary Examiner—Alan Holler
Attorney, Agent, or Firm—Burgess, Ryan and Wayne

[57] ABSTRACT

A process for chemical modification of polyolefins, particularly fibrillar, powder, granular or film polyolefins, in which one or more polar monomers are grafted to the polyolefins in an aqueous dispersion, by means of a free-radical generator.

Grafting is done in the presence of a wetting agent and a particular additive derived from alkanes and possessing at least 1 thiol function; the dispersion contains 0.1 to 50 parts weight of monomer, 0.1 to 3 parts weight of wetting agent, and 0.1 to 3 parts weight of additive, for 100 parts weight of polyolefin.

Polyolefins that have undergone this process have an improved wettability and, in applications requiring treatment in an aqueous suspension, such as the production of partly synthetic paper, this facilitates their dispersion in water.

17 Claims, No Drawings

PROCESS FOR CHEMICAL MODIFICATION OF POLYOLEFINS TO IMPROVE THEIR WETTABILITY

This invention concerns a process for modifying polyolefins chemically, particularly polyolefins in fibrillar or powder form, in order to improve their wettability.

Some applications achieve the preparation of compositions containing olefins by methods involving treatment of aqueous suspensions of these polyolefins. In the production of partly synthetic papers, for example, polyolefins in fibrillar form are added to the cellulose pulp by conventional papermaking techniques, involving mixing operations and treatments in aqueous suspension of the various ingredients to be added to the paper pulp.

Polyolefins are hydrophobic because of their purely hydrocarbon nature, so that they are difficult to place in an aqueous suspension; it is usually necessary to modify them, in order to give them a certain wettability, so that they can be dispersed in water, before using them in applications requiring treatments in aqueous suspension.

One method used to improve the wettability of polyolefins consists of fixing polar polymers derived from polar momomers such as vinyl pyridine, acrylamide, acrylic acid or methacrylic acid, by grafting them on the polyolefins. However, the wettability of the resulting products depends on the grafting rate (amount of polar polymer grafted to the polyolefins). To obtain a modified polyolefin with acceptable wettability, that is a modified polyolefin having a critical surface tension of at least 55 to 60 dynes/cm, and preferably equal to or greater than the critical surface tension of water, which is 73 dynes/cm, grafting rates of approximately 10% and more are needed, depending on the nature of the graft monomer.

This is a serious drawback, since these high grafting rates can be obtained only by using large quantities of monomers, ranging from 60 to 100% of the weight of polyolefin to be modified. They can also have an unfavorable effect on the properties of the polyolefin to which they are grafted. When lower monomer concentrations are used, the grafting reaction takes place, but the wettability of the modified polyolefins remains unsatisfactory.

The purpose of this invention is to provide a process to improve the wettability of polyolefins by grafting polar monomers to them, giving the modified polyolefins excellent wettability (critical surface tension of approximately 73 dynes/cm and above), for very low graft rates (generally less than 10%).

This new process for modifying polyolefins in order to improve their wettability comprises grafting one or more polar monomers to polyolefins in an aqueous dispersion, by means of a free-radical generator said grafting being performed in the presence of a wetting agent and an additive, selected from compounds derived from alkanes and possessing at least one thiol function, and at least one group selected from carboxylic, hydroxyl and halogen groups. The dispersion contains 0.01 to 50 parts by weight of monomer or monomer mixture, 0.1 to 3 parts by weight of wetting agent, and 0.1 to 3 parts by weight of additive, for 100 parts by weight of polyolefin.

Polyolefins which can be modified by this new process to improve their wettability comprise in particular olefin polymers and copolymers of olefins containing 2 to 8, and preferably 2 to 5, carbon atoms. The polyolefins include, without being limited thereto, polyethylene, polypropylene, polybutenes, polypentenes, ethylene and propylene copolymers, ethylene and butene copolymers, and poly(4-methylpentene-1). Such polyolefins are preferably in fibrillar, powder, granular or film form, when they undergo the grafting process. This process is particularly suitable to improve the wettability of polyolefin fibrils (obtained by any fibrillation technique, notably flash-spinning, extrusion spinning and film-fibrillation), or polyolefin powders.

Polar monomers suitable for this new process, used singly or mixed, are those represented by the formula:

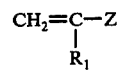

where: $R_1$ represents a hydrogen atom, an alkyl radical containing 1 to 4 carbon atoms or a halogen atom. Z represents a polar radical belonging to the group of pyridyl radicals,

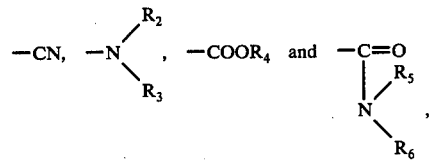

where: $R_2$ to $R_6$, which may be identical or different, each represent a hydrogen atom or alkyl radical, containing 1 to 8 carbon atoms, possibly hydroxylated or aminated.

Such monomers comprise, without being limited thereto, acrylic and methacrylic acids, α-chloracrylic acid, hydroxy-2-ethyl methacrylate, propylene glycol methacrylate, dimethyl amino-ethyl acrylate and methacrylate, hydroxy-2-ethylacrylate, propylene glycol acrylate, vinylpyridine, acrylamide, methacrylamide, hyroxymethylated acrylamide, and mixtures of these monomers.

The quantity of monomer or monomer mixture placed in contact with the polyolefin in order to carry out the grafting process is more specifically between 0.1 and 30 parts by weight, per 100 parts polyolefin, and preferably between 0.4 and 20 parts by weight, per 100 parts polyolefin.

Wetting agents that can be used in this new process may be cationic, anionic or non-ionic surfactants, or water-soluble polymers. Suitable surfactants include alkylsulphates of alkaline metals, such as sodium lauryl sulphate and sodium laurylsarcosinate, quaternary ammonium salts such as cetylpyridinium chloride, laurylpyridinium chloride, stearyltrimethylammonium p-toluene sulphonate, alkylphenoxy-polyoxyethylene-ethanols such as nonyl-phenoxy-polyoxyethylene-ethanol. Wetting agents of the water-soluble polymer type comprise, without being confined to, polyvinylic alcohols and polyacrylamides. The recommended quantity of wetting agent in the aqueous polyolefin dispersion is 0.1 to 2 parts by weight per 100 parts polyolefin.

The additive used in conjunction with the wetting agent in this polyolefin modification process belongs to the group of compounds defined by the formula:

HS—R—X, where:
R represents a saturated bivalent hyrocarbon radical derived from an alkane containing 1 to 18 carbon atoms, and possibly carboxylated, hydroxylated or halogenated; and
X represents a group selected from carboxylic, hydroxyl, thiol and halogen groups.

These compounds comprise, without being confined to, thioglycolic acid (also called β-mercaptoacetic acid), α-mercaptopropionic acid, β-mercaptopropionic acid, thiolactic acid, thiomalic acid, thioethanol, and thiopropanol. The recommended amount of additive is between 0.1 and 1 part by weight per 100 parts polyolefin.

The temperature at which the modification process is performed can vary considerably. It is generally below the melting point of the polyolefin, and preferably comprised between 60° and 110° C.

The substance used to initiate polymerization of the monomer and graft it to the polyolefin is selected from chemical free-radical initiators. These comprise, in particular, organic peroxides such as benzoylperoxide, lauroylperoxide, benzoylperoxides substituted on the aromatic nucleus, hydroperoxides, particularly cumene hydroperoxide, peracids, peresters such as tertiary butyl perbenzoate, azoic compounds such as azobisisobutyronitrile, Redox systems, or the polyolefins themselves which have previously undergone a peroxidation process, such as peroxidation by ozone, involving an existing peroxidation technique. Initiation of polymerization of the monomer and graft it to the polyolefin can also be done by making use of the effect of heat or of photoactive radiations, or the combined effect of heat or photoactive radiations and a chemical free-radical initiator.

Where a chemical free-radical initiator is used, the amount of initiator required usually corresponds to the amount used in grafting techniques in aqueous suspensions, generally between 0.2 and 5% of the weight of graft monomer.

In the reaction medium formed by the aqueous dispersion of polyolefin to be modified, containing the various other ingredients present during the grafting process, the ratio of the weight of polyolefin to the combined weight of polyolefin and water should be between 0.005 and 0.5, and preferably between 0.3 and 0.01.

The duration of the modification process, in other words the grafting reaction, can vary from a few minutes to several hours and preferably between 20 minutes and most 3 hours, and preferably between 30 minutes and 1½ hours.

The modification process comprises grafting a polar vinylic monomer to a polyolefin in an aqueous dispersion, using any known radical-type grafting process. For example, when grafting is done by using a chemical free-radical generator, the polyolefin, usually in the form of fibrils or powder, is dispersed in the aqueous phase containing the wetting agent, the polar monomer is dissolved in the resulting dispersion, and the free-radical initiator and additive are added to the dispersion, and the resulting reaction mixture is kept at a suitable temperature for enough time to obtain the required improvement in the wettability of the polyolefin. On completion of the process, the modified polyolefin is separated from the aqueous phase by filtration, then washed and dried. Recovered mother liquors can be reused as modifying liquid, after readjusting the quantities of monomer, free-radical generator and additive to the right levels. This is a major advantage, particularly when the modification process is to be performed continuously.

The invention is illustrated by the following examples, without being confined to them.

EXAMPLE 1

A series of tests was preformed to improve the wettability of polyethylene fibrils by grafting polyacrylamide to them, using the following process. 100g water, 5g polyethylene in the form of fibrils with an average length of approximately 1 mm, and a wetting agent consisting of sodium lauryl sulphate, or a polyacrylamide soluble in the aqueous phase, or a mixture of sodium lauryl sulphate and such a polyacrylamide, were placed in a 500 ml glass reactor.

These ingredients were agitated to disperse the polyethylene in the aqueous phase. Variable quantities of acrylamide were added to the resulting dispersion, the monomer being completely soluble in the aqueous phase. The mixture was then heated in an inert atmosphere to 93° C. When this temperature had been reached, 96 mg benzoyl peroxide, dissolved in a minimum amount of acetone, was added to the hot dispersion, as well as variable quantities of thioglycolic acid (additive corresponding to the invention), and the resulting reaction mixture was kept at a temperature of 93° C for 3 hours.

Modified fibrils were recovered by filtration, washed in water, then dried in a vacuum drier at 50° C.

The critical surface tension of the modified fibrils was then measured. Taking the critical surface tension of water (73 dynes/cm) as a reference, the wettability of modified fibrils was regarded as "rather good" when their critical surface tension was comprised between 55 and 65 dynes/cm, "good" when it was comprised between 65 and 73 dynes/cm, and "very good" when it was above 73 dynes/cm. The critical surface tension of the modified polyolefin was measured by the following technique, based on the method specified in ASTM-D 2578-67 standard.

In this technique for evaluating critical surface tension, the modified polyoelfin (in fibril, powder or film form) is placed on a slide, and drops of a liquid of known critical surface tension are deposited on it at several locations, using a pipette or micro-syringe. Several solutions, each with a known critical surface tension, are used, and when the drop disperses on the modified polyolefin within 3 seconds, the modified polyolefin is regarded as having the same critical surface tension as the liquid in question.

Operating conditions for each specific polyethylene fibril modification test, and the results obtained, are shown in Table I.

TABLE I

| Test no. | Type of polyethylene | Wetting Agent Type | Quantity (in g) | Quantity of monomer (in g) | Quantity of additive (in g) | Rate of graft monomer (% weight) | $\gamma_c$ (a) |
|---|---|---|---|---|---|---|---|
| 1 | | | 0,006 | 5 | 0 | 10 | 73 |

TABLE I-continued

| Test no. | Type of polyethylene | Wetting Agent Type | Wetting Agent Quantity (in g) | Quantity of monomer (in g) | Quantity of additive (in g) | Rate of graft monomer (% weight) | $\gamma_c$(a) |
|---|---|---|---|---|---|---|---|
| 2 | | | " | 2,5 | 0 | 6 | 51 |
| 3 | | | " | 1 | 0 | 1 | 42 |
| 4 | | sodium | " | 2,5 | 0,01 | 6 | >73 |
| 5 | | lauryl | " | 1 | 0,01 | 0,9 | >73 |
| 6 | LDPE(b) | sulphate | " | 0 | 0,01 | 0 | 40 |
| 7 | | | " | 0 | 0 | 0 | 40 |
| 8 | | | 0,030 | 0,5 | 0,01 | 0,3 | 72 |
| 9 | | | 0,030 | 0,4 | 0 | 0,1 | 42 |
| 10 | | | " | 0,4 | 0,01 | 0,2 | >73 |
| 11 | | | 0,030 | 0,3 | 0,01 | 0,2 | >73 |
| 12 | | | 0,006 | 2,5 | 0 | 0,6 | 43 |
| 13 | HDPE(c) | sodium | " | 2,5 | 0,01 | 0,6 | 73 |
| 14 | | lauryl | " | 1 | 0 | 0,2 | 41 |
| 15 | | sulphate | " | 1 | 0,01 | 0,2 | 73 |
| 16 | LDPE | polyacryl-amide | 0,100 | 0,5 | 0,01 | 0,3 | >73 |
| 17(d) | LDPE | lauryl sulphate + polyacryl-amide | 0,030 + 0,100 | 0,5 | 0,01 | 0,4 | 73 |

(a)$\gamma_c$ = Critical surface tension in dynes/cm
(b)LDPE = low-density polyethylene with a melt index (MI $^{190° C}_5$) equal to 4
(c)HDPE = high-density polyethylene with a melt index (MI $^{190° C}_5$) equal to 0.1
(d)The duration of the modification process for this test was only 1 hour.

The results given in Table I show that if no additive as recommended by the invention is used (see tests 1 to 3 and 7, 9, 12 and 14), the quantity of monomer needed to obtain satisfactory wettability in the modified fibrils is more than 50% of the weight of polyolefin, and even has to be at least approximately equal to the weight of polyolefin for the modified fibrils to show very good wettability.

Under the conditions of the invention, in other words, using an additive, modified fibrils with very good wettability ($\gamma_c$ more than 73 dynes/cm) can be obtained, using quantities of monomer not exceeding 50% of the weight of polyolefin to be modified, and usually approximately 10% of this weight (see particularly tests 8, 10, 11, 16 and 17).

These results show that the combination of additive as recommended according to the invention with small quantities of monomer produces modified polyolefins having a very good wettability. On the other hand, if no additive is used, a quantity of monomer at least approximately equal to the weight of polyolefin to be modified is needed to obtain equivalent wettability, while use of the additive along does not improve the wettability of the polyolefin (see tests 6 and 7).

EXAMPLE 2

A series of tests was performed to improve the wettability of polyethylene fibrils by grafting ethylene glycol methacrylate to them, using the following process.

100g water, 5g polyethylene in the form of fibrils with an average length of approximately 1 mm, and a wetting agent consisting of sodium lauryl sulphate, were placed in a 500 ml glass reactor.

These ingredients were agitated to disperse the polyethylene in the aqueous phase. Variable quantities of ethylene glycol methacrylate were added to the resulting dispersion, the monomer being completely soluble in the aqueous phase. The mixture was then heated in an inert atmosphere to 95° C. When this temperature had been reached, 96 mg benzoyl peroxide, dissolved in a minimum amount of acetone, was added to the hot dispersion, as well as variable quantities of additive (thioglycolic acid or mercapto-ethanol), and the resulting reaction mixture was kept at a temperature of 93° C for 3 hours.

The modified fibrils were then treated as described in Example 1, and their critical surface tension was measured.

Operating conditions for each specific polyethylene fibril modification test, and the results obtained, are shown in Table II.

TABLE II

| Test no. | Additive Type | Additive Quantity (in g) | Quantity of monomer (in g) | Quantity of wetting agent (in g) | Rate of graft monomer (% weight) | $\gamma^c$ |
|---|---|---|---|---|---|---|
| 21 | — | 0 | 1 | 0,006 | 13 | 48 |
| 22 | TGA(a) | 0,01 | 1 | 0,006 | 12 | 72 |
| 23 | — | 0 | 0,5 | 0,006 | 5,5 | 39 |
| 24 | TGA | 0,01 | 0,5 | 0,006 | 3,5 | 61 |
| 25 | TGA | 0,01 | 0,5 | 0,030 | 7,5 | >73 |
| 26 | MET(b) | 0,01 | 1 | 0,006 | 11 | 70 |

(a)Thioglycolic acid
(b)Mercapto-ethanol

The use of small quantities of ethylene glycol methacrylate, in the presence of an additive as recommended in the invention, produces, like acrylamide, modified polyethylene fibrils with good to very good wettability.

EXAMPLE 3

Tests to improve the wettability of polyethylene powder were carried out, under similar conditions to those described in Example 2, using a low-density polyethylene in powder form, with an average grain-size of approximately 250 microns, and replacing the ethylene glycol methacrylate with acrylamide; 0.03g sodium lauryl sulphate was used as wetting agent.

The specific operating conditions for each test, and results obtained, are shown in Table III.

TABLE III

| Test no. | Additive Type | Quantity (in g) | Quantity of monomer (in g) | Graft monomer rate (% weight) | $\gamma_c$ |
|---|---|---|---|---|---|
| 31 | — | 0 | 1 | 0,2 | 44 |
| 32 | TGA[a] | 0,01 | 1 | 1,2 | >73 |
| 33 | — | 0 | 0,5 | 0 | 42 |
| 34 | TGA | 0,01 | 0,5 | 0,2 | >73 |

[a]Thioglycolic acid

These results show that the grafting of small quantities of monomer to a polyolefin powder, in the presence of additive, also produces a modified powder with very good wettability.

EXAMPLE 4

Low-density polyethylene fibrils, with an average length of approximately 1 mm, were modified by grafting methylol-based acrylamide to them in the presence of thioglycolic acid, under the same operating conditions as for test 5 in Example 1, except that 0.03g sodium lauryl sulphate was used as wetting agent.

The resulting modified fibrils showed very good wettability ($\gamma_c$ more than 73 dynes/cm). Under the same conditions, but without using thioglycolic acid, the modified fibrils had insufficient wettability (65 $_c$ = 50 dynes/cm).

EXAMPLE 5

Low-density polyethylene fibrils, with an average length of approximately 1 mm, were modified by grafting acrylamide to them in the presence of thioglycolic acid, under the same operating conditions as for test 5 in Example 1, except that peroxide was not used, while the fibrils had been subjected to ozone peroxidation prior to their addition to the aqueous phase.

The resulting modified fibrils showed very good wettability (graft rate = 0.9% weight, $\gamma_c$ more than 73 dynes/cm).

When the process was repeated in the absence of the thioglycolic acid additive, there was no improvement in the wettability of the modified fibrils ($\gamma_c$ = 41 dynes/cm).

EXAMPLE 6

Polyolefin fibrils with an average length of approximately 1 mm were modified by grafting various hydrosoluble monomers to them in variable quantities, in the presence of additives as recommended in this invention, under the same general conditions as described in Example 1, and using 0.03g sodium lauryl sulphate as wetting agent.

Operating conditions for each specified polyethylene fibril modification test, and the results obtained, are shown in table IV.

TABLE IV

| Test no. | Type of polyolefine | Additive Type | Additive Quantity | Monomer Type | Monomer Quantity | $\gamma_c$ |
|---|---|---|---|---|---|---|
| 61 | PP[e] | — | — | acrylamide | 1 | 36 |
| 62 | PP | TGA | 0,015 | acrylamide | 1 | 58 |
| 63 | LDPE[f] | — | — | DAEM[p] | 1 | 38 |
| 64 | LDPE | TGA | 0,02 | DAEM | 1 | 70 |
| 65 | LDPE | — | — | MAA[k] | 0,8 | 41 |
| 66 | LDPE | TLA[g] | 0,02 | MAA | 0,8 | >73 |
| 67 | LDPE | — | — | AA[l] | 0,5 | 40 |
| 68 | LDPE | TMA[h] | 0,015 | AA | 0,5 | 73 |
| 69 | LDPE | — | — | VP[m] | 1 | 39 |
| 70 | LDPE | MPA[i] | 0,01 | VP | 1 | 72 |
| 71 | LDPE | — | — | PGM[n] | 1 | 39 |
| 72 | LDPE | TPP[j] | 0,02 | PGM | 1 | 73 |

[e]PP = polypropylene with a melt index ($MI_{3,8}^{30°C}$) equal to 5
[f]LDPE = low-density polyethylene with a melt index ($MI_2^{190°C}$) equal to 4
[g]TLA = thiolactic acid
[h]TMA = thiomalic acid
[i]MPA = β-mercaptopropionic acid
[j]TPP = thiopropanol
[k]MAA = methacrylic acid
[l]AA = acrylic acid
[m]VP = vinylpyridine
[n]PGM = propylene glycol methacrylate
[p]DAEM = dimethyl amino- ethyl methacrylate Polyolefins modified by the process recommended in this invention, involving the use of small quantities of monomer in the presence of additive, showed wettability properties ranging from "good" to "very good" (see tests 62, 64, 66, 68, 70 and 72), while no significant improvement in wettability was observed when the process using small quantities of monomer (less than 50% of the weight of polyolefin to be modified) was performed without any additive (see tests 61, 63, 65, 67, 69 and 71).

What is claimed is:

1. A process for improving the wettability of polyolefins comprising grafting at least one polar monomer to said polyolefins by:
   (A) contacting said polyolefins with 0.01 to 50 parts by weight of said polar monomer per 100 parts by weight of said polyolefin in an aqueous dispersion,
   (B) in the presence of:
   (1) a free-radical generator,
   (2) 0.1 to 3 parts by weight of a wetting agent per 100 parts by weight of said polyolefin, and
   (3) 0.1 to 3 parts by weight of an additive per 100 parts by weight of said polyolefin, said additive being represented by the formula

HS—R—X wherein R represents a member of the group consisting of saturated bivalent aliphatic hydrocarbon radicals having from 1 to 18 carbon atoms, and the corresponding carboxylated, halogenated, and hydroxylated radicals, and X represents a member of the group consisting of carboxyl, hydroxyl, thiol, and halogen groups.

2. The process as defined in claim 1, in which the polyolefins are olefin homopolymers or copolymers containing 2 to 8 carbon atoms.

3. The process as defined in claim 1, in which the polyolefins are in fibrillar, powder, granular or film form.

4. The process as defined in claim 1, in which the polar monomer is represented by the formula:

$$CH_2=C-Z$$
$$\phantom{CH_2=C-}|$$
$$\phantom{CH_2=C-}R_1$$

where:

$R_1$ represents a hydrogen atom, an alkyl radical containing 1 to 4 carbon atoms, or a halogen atom;

Z represents a polar radical selected from the group consisting of pyridyl radicals,

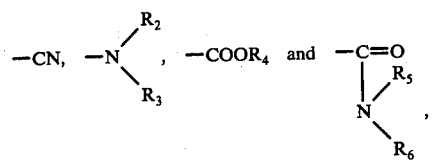

and wherein: $R_2$, $R_3$, $R_4$, $R_5$ and $R_6$, are independently selected from the group consisting of hyrogen and alkyl radicals, containing 1 to 8 carbon atoms, which can be hydroxylated or aminated.

5. The process as defined in claim 4, in which said polar monomer is selected from the group consisting of acrylamide, hydroxymethylated acrylamide, methacrylamide, vinyl pyridine, acrylic acid, methacrylic acid, α-chloracrylic acid, ethylene glycol acrylate and methacrylate, propylene glycol acrylate and methacrylate, dimethylaminoethyl methacrylate, and mixtures thereof.

6. The process as defined in claim 1, in which the quantity of said polar monomer is between 0.1 and 30 parts by weight per 100 parts by weight of polyolefin.

7. The process as defined in claim 1, in which the wetting agent is used in a quantity ranging from 0.1 to 2 parts by weight per 100 parts by weight of polyolefin.

8. The process as defined in claim 1, in which the wetting agent is a surfactant, water-soluble polymer, or a mixture thereof.

9. The process as defined in claim 1, in which the quantity of additive is between 0.1 and 1 part by weight per 100 parts polyolefin.

10. The process as defined in claim 1, in which the temperature at which the grafting is conducted is below the melting point of the polyolefin.

11. The process as defined in claim 1, in which the free-radical generator is a chemical free-radical initiator, selected from the group consisting of peroxides, peresters, peracids, hydroperoxides, azoic compounds, Redox systems and peroxidized polyolefins.

12. The process as defined in claim 1, in which the aqueous dispersion of polyolefin, the ratio by weight of polyolefin to the combined weight of polyolefin and water is between about 0.005 and 0.5.

13. A process as defined in claim 2, in which said polyolefins contain 2 to 5 carbon atoms.

14. A process as defined in claim 6, in which the quantity of said polar monomer is between 0.4 and 20 parts by weight per 100 parts weight of polyolefin.

15. A process as defined in claim 12, in which said ratio is between 0.3 and 0.01.

16. A process as defined in claim 10 in which the temperature is between 60 and 110° C.

17. A modified polyolefin with improved wettability and having a critical surface tension of at least about 60 dynes/cm consisting of a polyolefin having grafted thereto less than 10% by weight of a monomer represented by the formula $$CH_2=C-Z$$
$$\phantom{CH_2=C-}|$$
$$\phantom{CH_2=C-}R_1$$

where $R_1$ represents a hydrogen atom, a $C_1$-$C_4$ alkyl radical, or a halogen atom, Z represents a polar radical selected from the group consisting of pyridyl radicals,

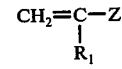

—COOR$_4$, and

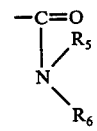

where $R_2$, $R_3$, $R_4$, $R_5$ and $R_6$ each represent a member selected from the group consisting of a hydrogen atom, a $C_1$-$C_8$ alkyl radical, a $C_1$-$C_8$ hydroxylated alkyl radical, and a $C_1$-$C_8$ aminated alkyl radical, said modified polyolefin being obtained by the process of claim 1.

* * * * *

UNITED STATES PATENT OFFICE
CERTIFICATE OF CORRECTION

Patent No. 4,080,405      Dated March 21, 1978

Inventor(s) Elias Agouri, et al

It is certified that error appears in the above-identified patent and that said Letters Patent are hereby corrected as shown below:

Column 3, line 52: Cancel "most" before "3"; insert --most-- before "preferably".

Column 4, line 15: "preformed" should be --performed--.

Column 5, line 60: "along" should be --alone--.

Column 7, line 53: "65 $_c$" should be -- $\Upsilon_c$ --.

Column 9, line 24: "— $COOR_4$" should be -- $—COOR_4,$ --.

line 31: "hyrogen" should be --hydrogen--.

Signed and Sealed this

Twenty-fourth Day of October 1978

[SEAL]

Attest:

RUTH C. MASON  
Attesting Officer

DONALD W. BANNER  
Commissioner of Patents and Trademarks